(12) United States Patent
Majumdar

(10) Patent No.: US 7,881,336 B2
(45) Date of Patent: Feb. 1, 2011

(54) HTB GATEWAY FOR HEALTHCARE TRANSACTION BASE

(75) Inventor: Anirban Majumdar, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1632 days.

(21) Appl. No.: 11/092,360

(22) Filed: Mar. 29, 2005

(65) Prior Publication Data

US 2006/0222003 A1  Oct. 5, 2006

(51) Int. Cl.
*H04J 3/16* (2006.01)
(52) U.S. Cl. .................... 370/466; 370/476
(58) Field of Classification Search ........... 370/466, 370/476; 704/5; 715/234; 705/3
See application file for complete search history.

(56) References Cited

U.S. PATENT DOCUMENTS

| | | | | |
|---|---|---|---|---|
| 5,715,466 | A | * | 2/1998 | Flanagan et al. ............... 704/5 |
| 6,182,119 | B1 | * | 1/2001 | Chu ........................... 709/206 |
| 2002/0061031 | A1 | * | 5/2002 | Sugar et al. .................. 370/466 |
| 2003/0074248 | A1 | * | 4/2003 | Braud et al. .................... 705/9 |
| 2006/0161840 | A1 | * | 7/2006 | Cohen et al. ................. 715/513 |
| 2006/0184492 | A1 | * | 8/2006 | Long et al. .................... 706/47 |
| 2008/0046292 | A1 | * | 2/2008 | Myers et al. .................... 705/3 |
| 2009/0024416 | A1 | * | 1/2009 | McLaughlin et al. ........... 705/3 |

* cited by examiner

*Primary Examiner*—Seema S Rao
*Assistant Examiner*—Sai-Ming Chan
(74) *Attorney, Agent, or Firm*—Aka Chan LLP

(57) ABSTRACT

Techniques for communicating with a Healthcare Transaction Base, such as an HTB, without requiring the development of custom adapters are provided. A gateway is utilized that acts a transformation engine between various systems and the healthcare transaction base. One or more filters are utilized to transform a message from one format to another. Adding support for new protocols is simplified as support for a new protocol is added (or plugged-in) by associating any filters that are used to transform messages in the new protocol to a desired protocol.

34 Claims, 7 Drawing Sheets

HTB GATEWAY FOR HEALTHCARE TRANSACTION BASE

BACKGROUND OF THE INVENTION

The present invention relates to computer systems. More specifically, the invention relates to providing a gateway that allows communication of messages in various protocols or message formats with Healthcare Transaction Base.

Healthcare Transaction Base (HTB) is a platform designed to process xml-encoded Healthcare Level 7 (HL7) Version 3 (V3) messages, including storage and retrieval of relevant data. HL7 is an ANSI-accredited standards developing organization focused on creating and maintaining standards with respect to clinical and healthcare administrative data.

There are many different systems that may desire to communicate with the HTB. For example, there can be an Admit Discharge Transfer (ADT) system that is used to manage admission, discharge and transfer of patients, an Order Entry system that is utilized to schedule medical tests and procedures for patients, a Pharmacy system for tracking the administration of drugs to patients, and the like. Each of these systems typically utilizes an Interface Engine (IE) to provide communication with the system and to other systems.

A problem occurs that the aforementioned systems may not be designed to communicate in the same protocol or message formats. For example, the systems can communicate with business level protocols such as GovTalk, HL7 V2.4 (an earlier version), csvfiles, EDI, XML GovTalk, HL7 V2.4 (an earlier version), csvfiles, EDI, XML, and the like. These other formats may not be compatible with HL7 V3 that is understood by the HTB.

One solution is to design an HTB adapter (or custom entry point) for each Interface Engine where the adapter is coded to transform or translate the messages to the protocol that the HTB understands. However, such a solution is unsatisfactory for a number of reasons. The time and resources that are needed to design these custom adapters can be significant, especially considering the desire by heathcare organizations to keep costs low. Also, the time required can also delay the implementation of the HTB. Additionally, the burden of maintaining these custom adapters may drain more resources from typically depleted budgets.

Accordingly, it would be beneficial to provide innovative ways to provide communication between systems that use different protocols than are recognized by the HTB. Additionally, it would be beneficial if such a solution was efficient and easy to maintain in order to reduce costs.

SUMMARY OF THE INVENTION

The present invention provides innovative techniques for communicating with a transaction database (e.g., HTB) without requiring the development of custom adapters. In general, a gateway is provided that acts a transformation engine between various systems and the transaction database. One or more filters are utilized to transform a message from one protocol to another. Adding support for new protocols is simplified as support for a new protocol is added (or plugged-in) by associating any filters that are used to transform messages in the new protocol to a desired protocol. Some specific embodiments of the invention are described below.

In one embodiment, the invention provides a method of transforming messages. A message is received on a particular protocol. A filter associated with that protocol transforms the message to an intermediate format and then another filter is applied to transform the message to a final (or second) format. The message is sent to another system on the same or different protocol.

In another embodiment, the invention provides a method of transforming messages for a Healthcare Transaction Base (HTB). A message is received on a particular protocol. A filter associated with that protocol transforms the message to an intermediate format and then another filter is applied to transform the message to HL7 V3 format. The message can be sent to the HTB to be persisted in the HTB.

Embodiments of the invention can act as a gateway and transformation engine for third party interface engines to send HL7 V3 messages into the HTB platform (and vice versa). By using a plug-in architecture, various low-level protocols can be supported by plugging in specific handlers needed by legacy healthcare applications as well as multitudinous data transformations needed to convert messages in other formats like EDI, XML to HL7 V3 XML format. Both synchronous and asynchronous communication can be supported. The filters can be both serial and parallel filters, dynamic deployable filters, and rudimentary scripting language for XPath predicates can be employed for content based routing and context propagation amongst filters.

Inbound and outbound engines can be utilized for sending and receiving messages. Load-balancing can be built in for inbound requests including support for MLLP-based channels which allow broadcast as well as wait-ack modes of communication. Moreover, high performance Java NativeIO can be used for its inbound and outbound engine. Server statistics can be collected and published such as the number of messages processed and the average time needed to process a message. A command line interface for administration of inbound and outbound engines can be provided, which uses an authentication scheme for administration requests.

Other features and advantages of the invention will become readily apparent upon review of the following description and association with the accompanying drawings, where the same or similar structures are designated with the same reference numerals.

DETAILED DESCRIPTION OF PREFERRED EMBODIMENTS

In the description that follows, the present invention will be described in reference to embodiments that provide a gateway to and from a transaction base, such as an HTB. However, embodiments of the invention are not limited any particular architecture, language, environment, application, or implementation. For example, although the invention is described in reference to the current HTB version (V3), the invention can be advantageously applied to any prior or subsequent versions of this standard or other standards. Therefore, the description of the embodiments that follows is for purposes of illustration and not limitation.

Figure 1:
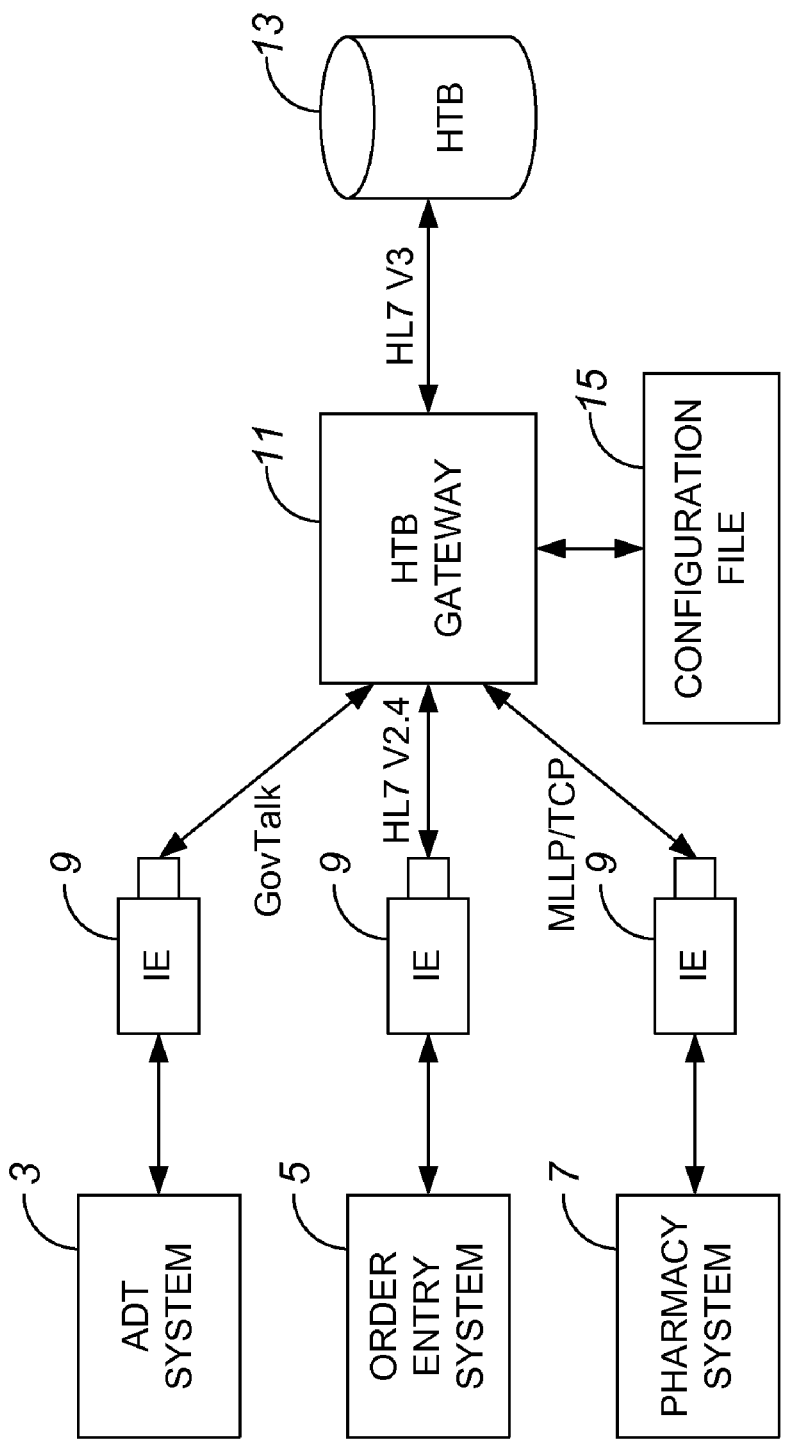
FIG. 1 shows an embodiment of the invention to acting as a gateway between systems and the HTB.

FIG. 1 shows an embodiment of the invention to acting as a gateway between systems and the HTB. As representative systems, there is an ADT system 3, Order Entry system 5 and Pharmacy system 7. Each of the systems includes an Interface Engine (IE) 9 that uses a different protocol. Although these three systems and protocols are representative, it should be understood that the invention is not limited to these systems or protocols as they are shown for illustrative purposes.

IEs 9 can communicate in business level protocols such as GovTalk, HL7 V2.4, CSV files, EDI, or XML. Additionally, IEs 9 can communicate in low-level protocols such as MLLP/TCP, MLLP/SSL/TCP, FTP, or SMTP. An HTB gateway 11 acts as a transformation engine between the protocols utilized by the IEs 9 and an HTB 13, which utilizes HL7 V3.

New protocols are pluggable in that it is very easy to add a new protocol, whether business level or lower level. One or more filters that are utilized to transform messages to (or from) a new protocol are stored in a configuration file 15 associated with the new protocol. Then, when messages in the new protocol are received (or are the desired protocol), the one or more filters are identified in configuration file 15 associated with the new protocol and utilized to transform the message. In this manner, new protocols can be very added.

In one embodiment, the HTB gateway is implemented on java platform (JDK 1.4), with the filters that are utilized to extend the functionality of HTB gateway and do custom transformations implemented in the Java Programming Language. However, other platforms and programming languages can be utilized in other embodiments.

The HTB platform is designed to process HL7 V3 messages that conform to certain HTB requirements. The V3 messages need to flow into and out of HTB to and from various interface engines. Almost all Healthcare applications and interface engines interoperate over MLLP/TCP protocol, which is a relic from the HL7 V2.x standards era. Recently, many interface engine vendors have added MLLP over SSL for secure message delivery. Embodiments of the invention can support any of these low level protocols and any other, if desired.

The HTB gateway is designed to bridge between the existing interface engines and the HTB platform over a standard set of protocols. It is also designed to handle the translation and transformation of data as it flows into HTB using various sets of parsers and transformers. In one implementation, the HTB gateway supports connectivity over MLLP on TCP/IP protocol. The gateway listens on multiple ports, with each port having a particular protocol handler assigned to it. The messages are transported over MLLP protocol, where the HTTP ports are for managing the server like starting and stopping the ports, channels, etc.

Figure 2:
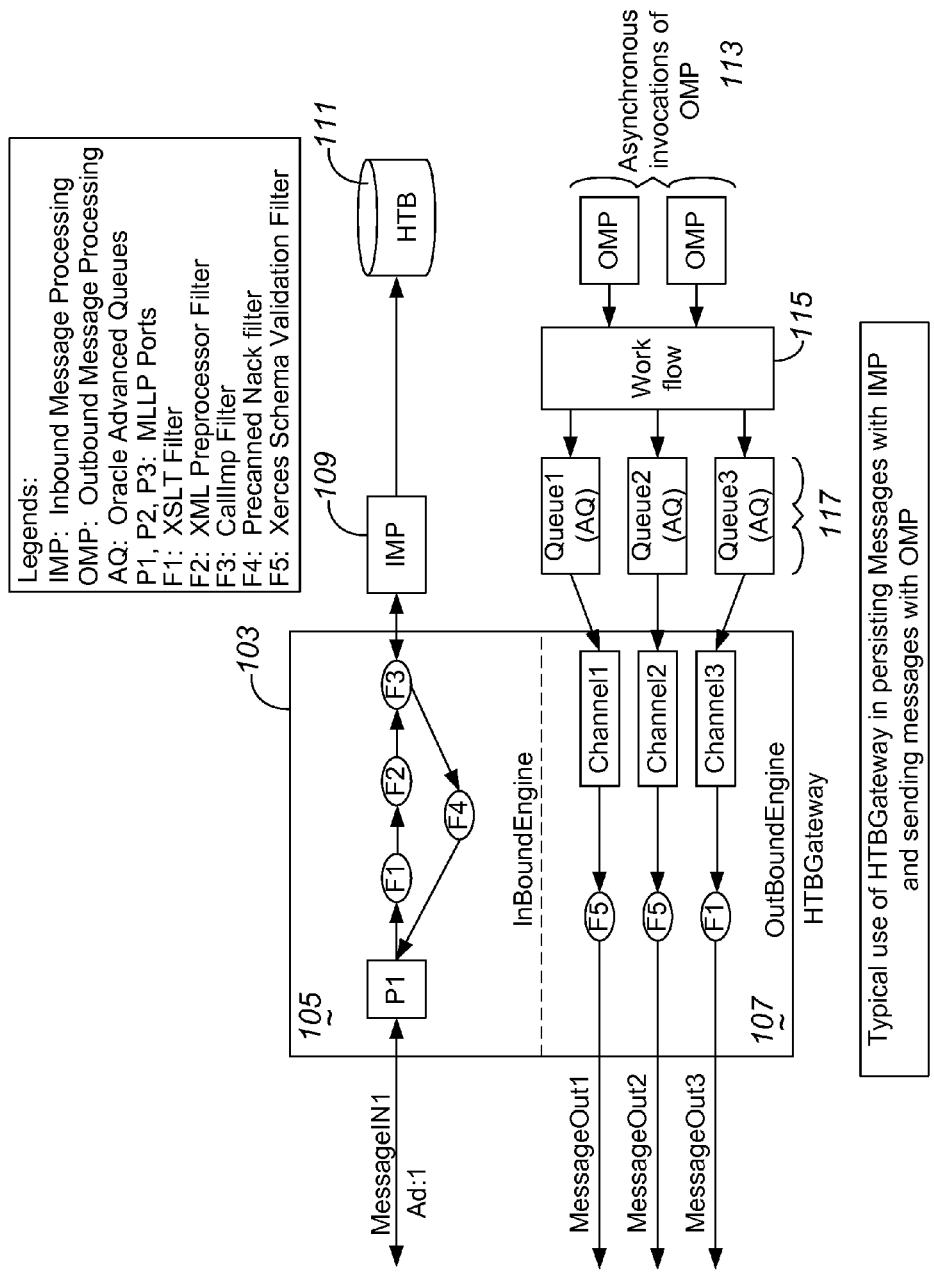
FIG. 2 shows a dataflow representation of an HTB gateway for both inbound and outbound messages.

FIG. 2 shows a dataflow representation of an HTB gateway for both inbound and outbound messages. An HTB gateway 103 conceptually includes an inbound engine 105 and an outbound engine 107.

Inbound engine 105 of the HTB gateway handles the inbound messages. The messages can be translated and transformed using an Inbound Message Processor (IMP) 109. The outbound messages are sent to different receiving systems by one or more Outbound Message Processors (OMPs) 113 via HTB gateway 103. The outbound messages can be translated, transformed using outbound engine 107 of the HTB gateway.

In inbound engine 105, there is a set of filters associated with each port through which an incoming message passes. The filters transform the message payload as it passes through it. On the inbound side, the interaction between the interface engines and the HTB gateway is synchronous in nature.

The incoming HL7 V3 messages are persisted using the IMP 109 service of HTB platform 111. The acknowledgement messages generated from the IMP service are routed back to the interface engine. Since the interaction between HTB gateway 103 and IMP 109 is synchronous, the interactions between interface engines and HTB 111 are synchronous in nature on the inbound side.

HTB gateway 103 establishes MLLP channels to interact with various interface engines. Even though, the interactions with the HTB gateway and interface engines are synchronous, HTB platform 111 does not integrate with interface engine in synchronous manner. The HTB platform sends outbound messages by raising Business Events asynchronously. The subscriber of these Business Events generates outbound messages, which are routed through workflow engine 115 and ends up on outbound queues 117.

The HTB gateway picks these messages up from the outbound queues and sends them out to the interface engines over the MLLP channels. There is a set of filters, which transforms the message on its way out. The acknowledgement message from the interface engine is then fed back into HTB 111 terminating the message flow state machine established in workflow to manage this conversation.

A configuration file (see FIG. 1) captures the configuration for various components of HTB gateway 103. The configuration file can be an XML document that is schema-validated at the startup of the HTB gateway. The configuration file has the set of constraints, which defines the behavior of the HTB gateway at runtime.

Inbound engine 105 has a list of ports as defined by the configuration file. Each of these ports is associated with a list of filters. As the messages flow in, they pass through these filters and are transformed. An inbound engine can support multiple ports for a sending system thereby allowing parallel processing of messages. IMP 109 processes the inbound messages and the acknowledgement created by it is sent back to the sending system. Filters can be configured to transform the acknowledgement message too, as shown.

For performance reasons in one embodiment, the inbound engine is implemented on non-blocking sockets implementation of JDK 1.4. Also, a protocol multiplexer exists which can multiplex the calls made into the inbound engine thus increasing the performance further.

In one embodiment, the configuration of the inbound engine in the configuration file starts with the tag <MLLP_PORTS>. Multiple MLLP_PORT elements can appear under the MLLP_PORTS tag to represent multiple MLLP ports the inbound engine can have. The ports are described by the attribute DESC and PORT. The description defined by DESC should be unique in the list of MLLP ports. The PORT attribute defines the port on which the inbound engine listens.

As described above, filters are utilized to transform messages within the HTB gateway. Filters are classified by the way they are invoked and where they lay in the data flow graph. For example, filters can be the following: serial filters, parallel filters, pre-filters and post-filters. An attribute CALL_ORDER in the configuration file can be utilized to specify the order in which the serial filters are invoked.

Figure 3:
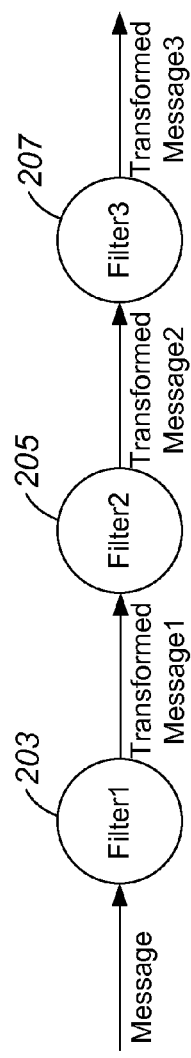
FIG. 3 shows a set of serial filters operating to transform a message.

FIG. 3 shows a set of serial filters operating to transform a message. A filter 203 transforms the message to an intermediate format, which is then transformed by a filter 205, which is then transformed by a filter 207, and so on. As an example, the final format can be HL7 V3 format.

Sets of parallel filters may be invoked concurrently. The work done by the parallel filters can be aggregated by use of various programming constructs like shared variables since they are invoked in the same virtual machine. In Java, a shared queue or a stack can be maintained as a work aggregator and filters can aggregate their work (transformed messages) onto this.

An example of implementation of such filters could be for an encounter summary message where an encounter summary is split up and transformed into separate V3 messages and persisted in parallel. In one embodiment, each invocation of parallel filters will spawn one thread.

Figure 4:
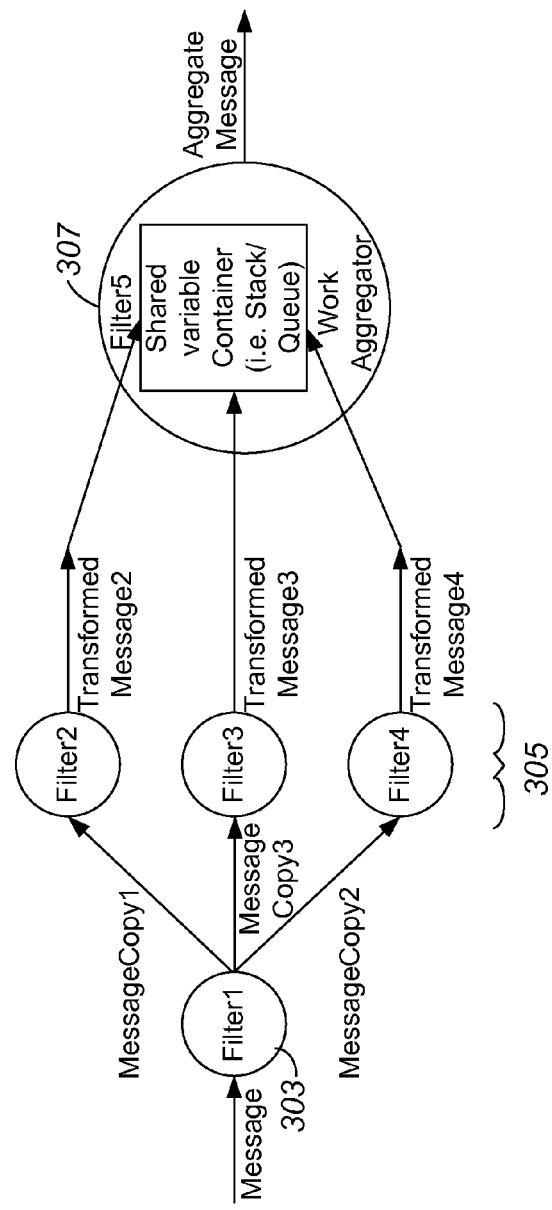
FIG. 4 shows a set of parallel filters operating to transform a message.

FIG. 4 shows a set of parallel filters operating to transform a message. A filter 303 (technically a serial filter) transforms a message to an intermediate format and forwards copies of the transformed message to filters 305, which are parallel filters. A filter 307 is utilized to aggregate the transformed messages from filters 305 into an aggregate message.

The qualifiers of "pre" and "post" in relation to the filters specify the order in which the filters are invoked in comparison to the persistence layer. These are syntactic indicators or additional constructs to help the administrator determine the way the filters are invoked.

The pre-filters are invoked before the persistence happens for the message and post-filters are invoked on the acknowledgement message on its way out to the sending system from the inbound engine.

For the outbound engine, the exact opposite happens. The pre-filters are invoked on the messages sent to the receiving system and the post-filters are invoked on the acknowledgements received from the receiving system.

In one embodiment, the set of filters for purposes of configuration is specified by the element FILTER_CONFIG and has two attributes: PARALLEL and CALLBACK_TYPE. If PARALLEL="true" then the set of filters are of parallel type. If PARALLEL="false" then the set of filters are of serial type. Similarly, CALLBACK_TYPE can be "PRE" or "POST."

There can be multiple FILTER_CONFIG elements inside MLLP_PORT and there can be multiple FILTER_CLASS elements inside the FILTER_CONFIG. The filter configuration can be contained inside the tag FILTER_CLASS, which has a NAME, CALL_ORDER and CLASS_NAME attribute. The NAME attribute should be unique within the context of a MLLP_PORT. The CLASS_NAME defines the filter class. Each FILTER_CLASS element can have multiple name-value pairs, which are passed to the filter class at runtime. These name value pairs are defined by the element PARAMETER. The attributes NAME and VALUE define the name value pair to be passed to the filter class. The parameter NAME should to be unique amongst the list of name value pairs for a filter, as it becomes the key to the hash table passed to the init method of the filter.

Figure 5:
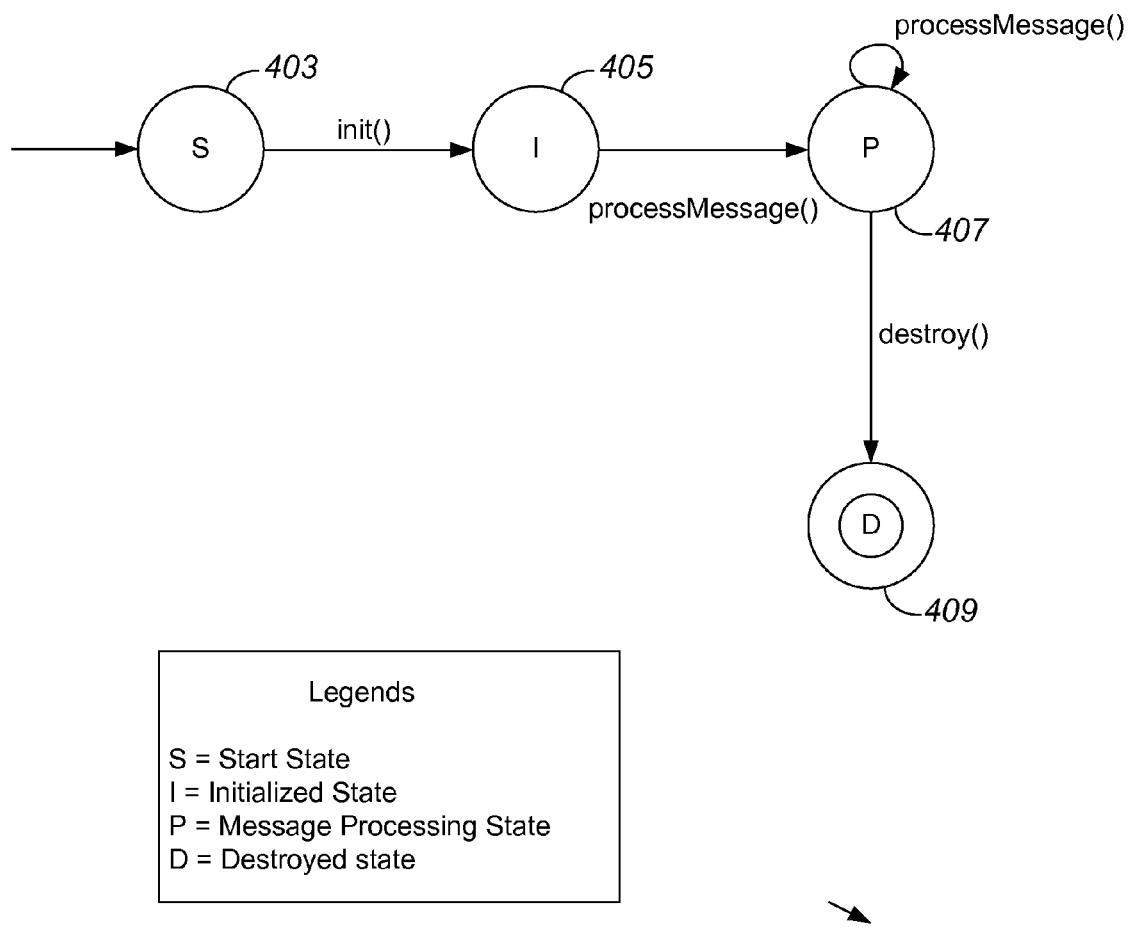
FIG. 5 shows an example of a lifecycle of a filter.

In one embodiment, the filter lifecycle is simple. FIG. 5 shows an example of a lifecycle of a filter. At a start state 403, the filter is initialized. Then, at an initialized state 405, processes messages. Messages are further processed in a message processing state 407. At some point when the filter is not longer needed, the filter is destroyed leading to a destroyed state 409. In other embodiments, parameterized lifecycle support and lifecycle extension can be provided.

The three methods called in FIG. 5 will be described in more detail below:

public void init (Hashtable options)

This method is invoked to do the initialization for the filter. The hashtable has the name value pairs that were defined in the configuration file. This method gets called at the start of the HTB gateway for all the filters.

public String processMessage (String payload)

This method is invoked when the message passes through the HTB gateway. The nature of invocation depends on type of filters. The return from the processMessage has to be a String representing the transformed message. This transformed message is then passed over to the next filter. If the next set of filters happens to be parallel, then a copy of the transformed message is passed to each of these filters.

public void destroy ( )

This method is called at the time the HTB gateway is shutdown. This method should destruct all the resources the filter had acquired during its lifecycle.

With the invention, writing custom filters can be done easily and efficiently. If the message needs custom transformation that cannot be achieved from the bundled filters, then a custom filter can be written to support the transformation.

All filters should be written to extend from the abstract base class. This way, all filters will implement the three abstract methods, init, processPayload and destroy. The users of the HTB gateway can easily write their own filters and invoke them.

The outbound engine of the HTB gateway can be intricately linked with the OMP. An asynchronous message generation request is first initiated by calling OMP. The subscription code for Workflow generates the message, does conversation management and then enqueues the message onto the queue. Every receiving system has a queue associated with it and the enqueing happens based on the receiving system the message is destined for. The HTB gateway picks up the messages from the queue and sends it out the receiving system using MLLP Channels.

Figure 6:
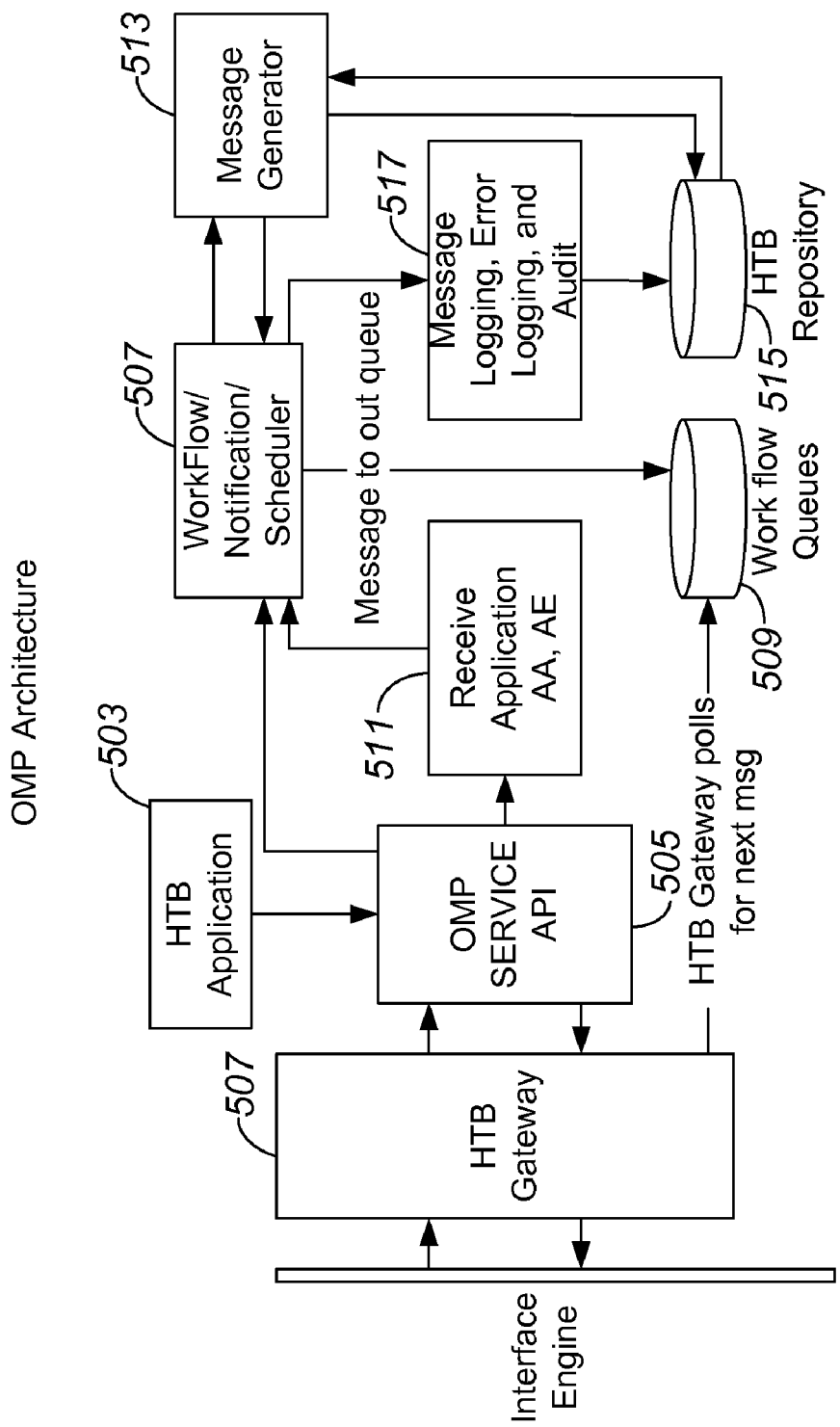
FIG. 6 illustrates the architecture for an Outbound Message Processor (OMP).

Now that the IMP has been described, FIG. 6 illustrates an architecture for an Outbound Message Processor (OMP). An HTB gateway 507 is in communication with OMP service APIs 505. As shown, an HTB application 503 can call the OMP service APIs.

HTB gateway 507 polls for the next message from one or more workflow queues 509. The workflow queues are filled and message scheduled at a workflow notification/scheduler 507. The AA 511 and AE 511 denotes Application Accept and Application Reject respectively. After HTB sends a message to the receiving system via HTBGateway, it receives either a Application Accept(AA) from the receiving system on successful delivery of the message to the receiving system or a Application Reject(AE) on unsuccessful delivery of the message to the receiving system. Depending on whether the ack is AA or AE, the state of the Workflow is modified.

Message logging, error logging and audit 517 services are provided with the results stored in an HTB repository 515. A message generator component that generates the message accoding to HL7 V3 specifications is invoked on subscription to Business Events that are raised when a request to generate a message is sent to the OMP Service.

There are three flags that control the behavior of interaction between the HTB gateway and a receiving system in one embodiment. They are ack_type, wait_flag and channel_blocked_status flag. These exist in a ctb_ms_receiver_config table and they should not be changed while the HTB gateway is running. If they are changed, the behavior of HTB gateway will be undefined.

The ack_type defines whether the ack received from the receiving system needs to be processed or not. The wait_ack_flag defines whether HTB gateway should wait till the preceding message is transferred fully before transferring the new message. The message is not fully transferred until a successful ack is returned from the receiving system and processed by the HTB (provided ack_type is "A"). The interaction behavior between HTB gateway and the receiving system is as follows.

HTB gateway sends a message to the receiving system. If the ack_type is "A" and wait_ack flag is "Y", then it will process the ack and after the ack is successfully processed, it will send the next message. If the ack is not successfully processed in HTB, the channel will be in a blocked status mode. If the ack_type is "N", but the wait_ack_flag is "Y", then the HTB gateway will not process the ack but will send the next message as soon as it gets either an ack or a nack from the Receiving System. If the ack_type is "A" but the wait_ack_flag is "N", HTB gateway will process the ack or nack that it receives from the Receiving System but will not stop the channel if the ack is not processed properly or a nack is received. If the ack_type is "N " and if wait_ack_flag is "N", then HTB gateway keep sending the message one after another without caring whether it received any sort of ack or nack from the receiving system.

The wait_ack_flag and the ack_type can be modified and updated using the configuration API of OMP. Please refer to HTB javadocs for the configuration APIs. The HTB gateway can have multiple MLLP channels for a Receiving System. The configurations for MLLP channels are covered in the section below. Each channel can have serial and parallel filters as described in the sections above.

The outbound engine can be configured utilizing four sections in the conficturation file: HTB gateway schema details, queue xchema details, application login information details and receiving system information.

The HTB gateway schema details describe the login information to EBusinessSuite database schema using a preconfigured HTB gateway user. The HTB gateway uses this information to connect directly to the application database to control the lifecycle of channels. For example, if the ack_type is "A" and wait_ack flag is "Y", and the channel receives a nack, the HTB gateway will turn the channel status to "blocked" state by connecting directly to the database. The elements are self-describing and included below. The host and the port define the hostname and the port where the Oracle database server is hosted for EBusiness Suite.

The queue schema details are similar in nature to HTB gateway schema details. For enqueuing and dequeuing operations, the HTB gateway needs to login to the database as a user having AQ Administrator privileges. The various names of queues specified in "queue name" column of the ctb_ms_receiver_config table contain the name of the schema, which owns the queues as a suffix to the full name. The HTB gateway uses the queue owner tag to strip away the suffix to get the queue name The EBusinessSuite login information is needed by HTB gateway to process acknowledgement messages, log errors etc. in one embodiment. This information may be required by any HTB RMI client to make a client call.

The receiving system information definition starts with RECEIVING_SYSTEM_INFO tag. There can be multiple receiving systems defined by RECEIVING_SYSTEM_CHANNELS tag and each receiving system channel will have multiple MLLP channels described by MLLP_CHANNEL tag. Both receiving system and mllp_channel can share same name if there is just one mllp channel configured as a part of the receiving system.

A MLLP_CHANNEL can have seven attributes as follows:

A hostname described by HOSTNAME tag defines the hostname of the receiving system.

PORT describes the ports of the receiving system to which the messages are sent. It is a TCP/IP port on which the receiving system is listening for messages.

The connection_retries attribute describes the number of times HTB gateway would try to connect to the Receiving System before aborting. It is described by CONN_RETRIES tag.

The send retries attribute defines the number of times HTB gateway would try to send a message on the existing connection to Receiving System. It is described by SEND_RETRIES tag.

The attribute "pause time between connects" describes the time to pause before an effort is made connect to the receiving system and is described by PAUSE_TIME_BETWEEN_CONNECTS tags.

The attribute "send timeout" describes the time HTB gateway would wait to time out the connection while sending the message. Sometimes, the network can have very little bandwidth and hence sending the message could take a long time. This configuration allows the channel to stop sending the message once the time elapsed in sending a message becomes greater than the "send timeout". It is described by SEND_TIMEOUT tag.

The attribute "receive timeout" describes the time HTB gateway would wait to time out the connection while receiving the message. Sometimes, the network can have very little bandwidth and hence receiving the message could take a long time. This configuration allows the channel to stop receiving the message once the time elapsed in sending a message becomes greater than the "receive timeout". It is described by RECEIVE_TIMEOUT tag.

Each MLLP Channel can have a series of filters configured for it. Please refer to the Filter section for details. After a filter is developed, the same filter can be used for both inbound and outbound.

The administration of HTB gateway is handled by command line options. The administration requests can be sent to HTB gateway from any machine in the network. Hence HTB gateway can be administered remotely. All administration command line requests are routed to a HTTP server. There can be multiple HTTP servers and hence ports configured in the configuration file. The <adminhost> refers to the hostname where the gateway is running. The <adminport> refers to the port on which the HTTP server is running. The administration of the HTB gateway contains the following tasks:

Starting and stopping individual MLLP ports or all together. The HTTP server continues running even if the ports are stopped.

Starting and stopping individual MLLP Channels or channels configured for a receiving system or all together.

Aborting the HTB gateway, which includes shutting down the entire MLLP Ports, MLLP Channels, and HTTP server.

A password should be passed from the command line to do the administrative tasks. The password hash can be generated using the command line. This hash needs to be placed in the configuration file like the snippet shown below. The HTB gateway uses this hash as a seed to do authentication when administrative commands are invoked on the HTB gateway. The hash present in configuration file is not used directly to do authentication. The password expiration time is used to control the timeout for the session established between administrative clients of HTB gateway and the HTB gateway. The password expiration time is a mis-nomer as it refers to "session expiration time". The time is in seconds.

Inbound MLLP ports are the ports that accept inbound messages. Outbound Channels are used to send messages to receiving systems. Each receiving system can have multiple channels specified for that receiving system.

Figure 7:
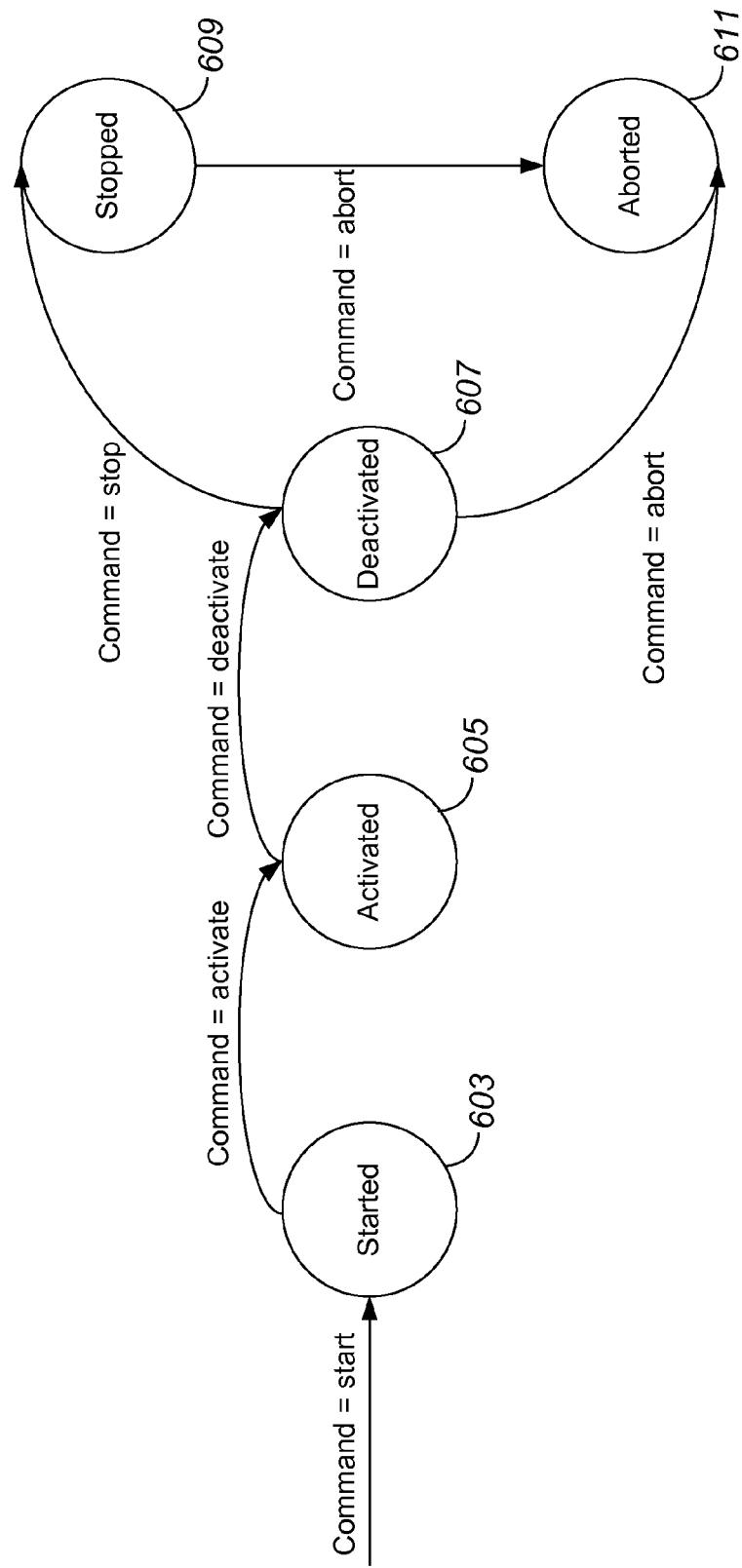
FIG. 7 shows an example of a lifecycle of a Minimal Lower Level Protocol (MLLP) channel.

Outbound MLLP channels have a lifecycle associated with them. FIG. 7 shows an example of a lifecycle of an Minimal Lower Level Protocol (MLLP) channel. In the embodiment shown, there are five commands relating to the channels: start, activate, deactivate, stop and abort.

All channels are stated at 603 in response to a start command. The channels can be activated at 605 by an activate command. The channels are now started and activated.

The channels can be deactivate at 607 by a deactivate command. Once deactivated, the channels can be stopped at 609. This option is provided to allow outbound channels to stop gracefully. The channels complete their work and then shut down. If the channels need to be aborted then the channels can be aborted at 611 by an abort command. This option is provided to allow the outbound channels to abort the work they are doing and terminate. In one embodiment, no option to abort individual channels is provided.

The tag LOG in the configuration file controls HTB gateway logs. The three elements that control the logging are LOGDIR, which specifies the directory where the logs are created, MAXSIZE that specifies the maximum size of the log file, and NUMLOGFILES, which specifies the number of log files that can exist at the moment. Please note that the LOGDIR must exist before the HTB gateway is started. When the current log file exceeds the MAXSIZE, HTB gateway opens a new one. The current log file exists till the number of logfiles exceeds the number specified in NUMLOGFILES. The least current log files are deleted.

A tag DEBUG_LEVEL can be utilized to control the granularity of the debugging. The HTB gateway uses this logging granularity to log various events. The filters can use the logging framework provided as a part of HTB gateway or can implement their own.

Also, a utility to test the inbound engine of the HTB gateway can be provide. This utility can be used to test whether the MLLP ports are open and are accepting messages. With this utility and PrecannedNackFilter bound to a particular port, a simple loopback test can be done to see if the port is working. Additionally, a fully transformed V3 message can also be sent to a port to see whether the message is being routed to OC4J server and getting persisted properly. A successful completion of this test would mean that the production systems could start sending messages.

The HTB gateway of one embodiment supports MLLP protocol as the protocol of choice for interoperating with other interface engines. Support for advanced protocols like web service, web service- choreography etc. can be added in other embodiments.

Multiple instances of HTB gateway can be run at the same time. Each instance of HTB gateway runs in a single JVM and there may not be a mechanism for one HTB gateway to talk to another. However, support for HTB gateway clusters can be provided in other embodiments to allow these functionalities.

In order to split a message into component messages, there should be a support for MLLP channels and virtual MLLP channels on the inbound side. With this functionality, a multithreaded client would have been able to send messages to HTB gateway over different virtual MLLP channels on a single port. One of the uses of such functionality is using a discriminator to split a message stream into component streams that can then be persisted in parallel. For example, all order messages can be treated in this way, as the volume of order messages is huge. Messages can still be divided into streams by sorting it in interface engine and sending it to different ports of HTB gateway.

Support for multiple ad-hoc connections from sending system to one port can be implemented in some embodiments. This way the multiplexing of multiple virtual channels can be supported for a single MLLP port.

Additionally, support for advanced concepts like MPI (Message Passing Interface) or generative communication between filters can be provided. Also, support for thread pool and filter pool for parallel filters can be provided as well.

Figure 8:
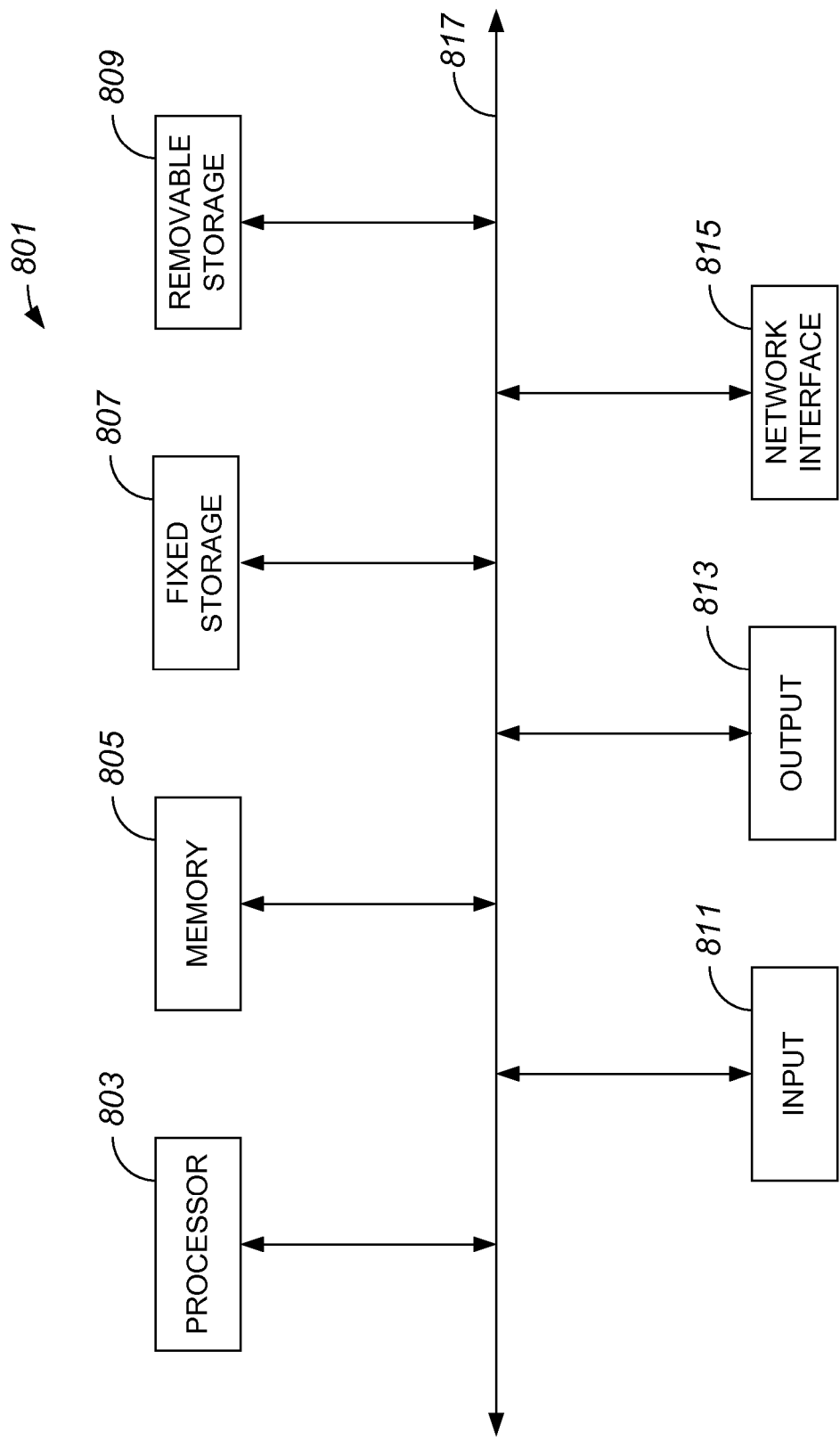
FIG. 8 illustrates a block diagram of a computer system that can be utilized in association with embodiments of the invention.

FIG. 8 shows a block diagram of components that can be present in computer systems that implement embodiments of the invention. A computer system 801 includes a processor 803 that executes instructions from computer programs (including operating systems). Although processors typically have memory caches also, processor 803 utilizes memory 805, which can store instructions or computer code and data.

A fixed storage 807 can store computer programs and data such that it is typically persistent and provides more storage when compared to memory 805. At present, a common fixed storage for databases is multiple (e.g., arrays) hard drives. A removable storage 809 provides mobility to computer programs and/or data that are stored thereon. Examples of removable storage are floppy disks, tape, CD/ROM, flash memory devices, and the like.

Memory 803, fixed storage 807 and removable storage 809 provide examples of computer readable storage media that can be utilized to store and retrieve computer programs incorporating computer codes that implement the invention, data for use with the invention, and the like. An input 811 allows a user to interface with the system. Input can be done through the use of a keyboard, a mouse, buttons, dials, or any other input mechanism. An output 813 allows the system to provide output to the user. Output can be provided through a monitor, display screen, LEDs, printer or any other output mechanism.

A network interface 815 allows the system to interface with a network to which it is connected. The system bus architecture of computer system 801 is represented by arrows 817. The components shown in FIG. 8 can be found in many computer systems. However, components can be added, deleted and combined. For example, fixed storage 807 could be a file server that is accessed through a network connection. Thus, FIG. 8 is for illustration purposes and not limitation.

Most healthcare enterprises are usually cash-strapped and they have interface engines already in place to exchange messages. Since HTB gateway can interoperate with any interface engine over a set of standard protocols, healthcare enterprises will not need an additional piece of software in the form of adapters to plug HTB Platform into their existing infrastructure. This will increase the level of penetration of HTB in the Healthcare space and also accelerate implementation of HTB in the marketplace, as the solution is offered as out-of-the-box solution.

The HTB gateway is highly extensible and developing filters is very easy. It imposes a simplified life-cycle for filters. Support for other low-level protocols besides MLLP can be added without any change to the architecture. Support for other business level protocols like HL7 V24, X12 can be added by building a filter that would house a parser and transformation engine for that protocol.

In other embodiments, SNMP traps are provided for easy Operational, Administration and Management of the modules, improved the scripting language for Path predicates, and/or providing data parallel execution Xpath expression for XML Twigs.

While the above is a complete description of preferred embodiments of the invention, various alternatives, modifications, and equivalents can be used. It should be evident that the invention is equally applicable by making appropriate modifications to the embodiments described above. For example, although properties of specific embodiments have been described, embodiments of the invention are not limited to these properties. Therefore, the above description should not be taken as limiting the scope of the invention that is defined by the metes and bounds of the appended claims along with their full scope of equivalents.

What is claimed is:

1. A method of transforming messages, comprising:
receiving a message in a first protocol, wherein the first protocol comprises a Minimal Lower Level Protocol (MLLP) protocol;
using a computer processor, applying a first filter associated with the first protocol to transform the message to an intermediate format;
applying the first filter to forward a first copy of the message in the intermediate format to a second filter and a second copy of the message in the intermediate format to a third filter, wherein the second and third filters are in parallel and share a variable stored in computer memory;
invoking the second and third filters concurrently, wherein the invoking the second filter comprises transforming the first copy to a first partial message in a second protocol and spawns a first thread that uses the shared variable, and the invoking the third filter comprises transforming the second copy to a second partial message in the second protocol and spawns a second thread that uses the shared variable, wherein the second protocol comprises a Healthcare Level 7 (HL7) protocol;
applying a fourth filter to aggregate the first and second partial messages from the second and third filters into an aggregated message in the second protocol; and
sending the aggregated message in the second protocol.

2. The method of claim 1, further comprising:
adding a new protocol;
receiving at least one filter for the new protocol that are utilized to transform a message in a new format; and
storing the at least one filter for the new protocol as being associated with the new protocol.

3. The method of claim 1, where the filters are stored in a configuration file associated with a protocol.

4. The method of claim 1, where the filters are pre-filters or post-filters.

5. The method of claim 1, wherein sending the message comprises sending the message to a Healthcare Transaction Base (HTB) and where the second protocol comprises HL7 V3.

6. The method of claim 1, wherein receiving the message comprises receiving the message from a Healthcare Transaction Base (HTB) and where the first protocol comprises HL7.

7. The method of claim 1, wherein the first protocol comprises GovTalk, HL7 V2.4, csvfiles, EDI, or XML.

8. The method of claim 1, wherein the second protocol comprises MLLP/TCP, MLLP/SSL/TCP, File Transfer Protocol (FTP), or Simple Mail Transfer Protocol (SMTP).

9. A computer program embodied using a nontransitory computer-readable medium that transforms messages, when executed by a computer processor, comprising:
computer code that receives an inbound message in a first protocol, wherein the first protocol comprises a Minimal Lower Level Protocol (MLLP);
computer code that applies a first filter associated with the first protocol to transform the inbound message to an intermediate format;
computer code that applies a second filter to transform the inbound message in the intermediate format to a second protocol, wherein the second protocol comprises a Healthcare Level 7 (HL7);
computer code that sends the inbound message in the second protocol;
computer code that initiates a first asynchronous message generation request by calling a first outbound message processor, wherein a first outbound message is created and placed on a first outbound queue associated with a first receiving system;
computer code that initiates a second asynchronous message generation request by calling a second outbound message processor, wherein a second outbound message is created and placed on a second outbound queue associated with a second receiving system;
computer code that polls the first and second queues for a next outbound message;
computer code that picks up the next outbound message in the second protocol from the first outbound queue or the second outbound queue;
computer code that applies at least a third filter associated with the second protocol to transform the first outbound message to the first protocol if the next outbound message is the first outbound message;
computer code that applies at least a fourth filter associated with the second protocol to transform the second outbound message to a third protocol if the next outbound message is the second outbound message, wherein the third protocol is associated with the second receiving system, and the third protocol comprises MLLP; and
a computer readable medium that stores the computer codes.

10. The computer program of claim 9, wherein the computer readable medium is a CD-ROM, floppy disk, tape, flash memory, system memory, or hard drive.

11. A system, comprising:
a transaction database that communicates in a first protocol, wherein the transaction database sends outbound messages by asynchronously raising business events;
a subscriber that subscribes to the business events and generates outbound messages, wherein the outbound messages are enqueued on an outbound queue; and
a gateway that receives messages for the transaction database in a second protocol, applies a first filter associated with the second protocol to transform the message to an intermediate format, applies a second filter to the message to transform the message in the intermediate format to the first protocol, and sends the message in the first protocol to the transaction database, wherein the first and second filters extend from a same base class, and the first protocol comprises Healthcare Level 7 (HL7) and the second protocol comprises Minimal Lower Level Protocol (MLLP).

12. The system of claim 11, further comprising a configuration file that stores the at least one filter associated with second protocol.

13. A method of transforming messages for a Healthcare Transaction Base (HTB), comprising:
receiving a first message in a first protocol, wherein the first protocol comprises Healthcare Level 7(HL7);
using a computer processor, applying a first filter associated with the first protocol to transform the first message to an intermediate format;
applying a second filter to transform the first message in the intermediate format to a second protocol, wherein the second protocol comprises Minimal Lower Level Protocol (MLLP);
sending the first message in the second protocol to the HTB;
receiving a second message in a second protocol from the HTB;

applying the second filter associated with the second protocol to transform the second message to the intermediate format;

applying a third filter to transform the second message in the intermediate format to a third protocol, wherein the third protocol comprises MLLP; and sending the second message in the third protocol.

14. The method of claim 13, further comprising:
adding a new protocol;
receiving at least one filter for the new protocol that are utilized to transform a third message to the third protocol; and
storing the at least one filter for the new protocol as being associated with the new protocol.

15. The method of claim 13, further comprising:
receiving a third message in the third protocol from the HTB;
identifying at least one filter associated with the first protocol to be applied to the third message to transform the third message to the first protocol;
applying the at least one filter to transform the third message to the first protocol; and
sending the message in the first protocol.

16. The method of claim 13, where the filters are stored in a configuration file associated with a protocol.

17. The method of claim 13, where the filters are pre-filters, post-filters, parallel filters or serial filters.

18. The method of claim 13, wherein the first protocol comprises GovTalk, HL7V2.4, csvfiles, EDI, or XML.

19. The method of claim 13, wherein the first protocol comprises MLLP/TCP, MLLP/SSL/TCP, FTP, or SMTP.

20. A computer program embodied using a nontransitory computer-readable medium that transforms messages for a Healthcare Transaction Base (HTB), when executed by a computer processor, comprising:
computer code that receives an inbound message in a first protocol, wherein the first protocol comprises Healthcare Level 7 (HL7);
computer code that applies a first filter associated with the first protocol to transform the inbound message to an intermediate format;
computer code that applies a second filter to transform the inbound message in the intermediate format to a second protocol, wherein the second protocol comprises Minimal Lower Level Protocol (MLLP);
computer code that sends the inbound message in the second protocol to the HTB;
computer code that sends a first outbound message to a receiving system;
computer code that receives an acknowledgement associated with the first outbound message from the receiving system, wherein a first flag defines whether the acknowledgement should be processed, and a second flag defines whether to wait until the first outbound message is fully transferred before transferring a second outbound message to the receiving system; and
a computer readable medium that stores the computer codes.

21. The computer program of claim 20, wherein the computer readable medium is a CD-ROM, floppy disk, tape, flash memory, system memory, or hard drive.

22. A system, comprising:
an Healthcare Transaction Base (HTB) that communicates in a first protocol; and
a gateway that receives a message for the transaction database in a second protocol, initializes a first filter by invoking a first method that accepts a first parameter, wherein the first parameter is a first key to a hash table, and
invokes a second method to apply the first filter associated with the second protocol to transform the message to an intermediate format, wherein the second method returns a string value representing the message in the intermediate format,
initializes a second filter by invoking the first method that accepts a second parameter, wherein the second parameter is a second key to the hash table, and
invokes the second method to apply the second filter to the message to transform the message in the intermediate format to the first protocol, wherein the second method returns a string value representing the message in the first protocol, and sends the message in the first protocol to the HTB,
wherein the first protocol comprises Minimal Lower Level Protocol (MLLP) and the second protocol comprises Healthcare Level 7 (HL7).

23. The system of claim 22, further comprising a configuration file that stores the at least one filter associated with the first protocol.

24. The method of claim 1 wherein the filters are implemented in the Java programming language.

25. The method of claim 1 wherein the applying a fourth filter to aggregate comprises the fourth filter aggregating the first and second partial messages on a shared queue or stack.

26. The method of claim 1 further comprising collecting statistics, wherein the collecting statistics comprises:
calculating a number of messages processed, and
calculating an average time needed to process a message.

27. The method of claim 1 wherein the first protocol comprises at least one of MLLP/TCP or MLLP/SSL/TCP.

28. The method of claim 3 comprising:
before the applying the first filter associated with the first protocol, initializing the first filter, wherein the initializing the first filter comprises invoking a first method in the configuration file and passing a hashtable to the first method.

29. The computer program of claim 9 further comprising:
computer code that sends the first outbound message in the first protocol to the first receiving system if the next outbound message is the first outbound message; and
computer code that sends the second outbound message in the third protocol to the second receiving system if the next outbound message is the second outbound message.

30. The computer program of claim 9 wherein the first protocol comprises HL7.

31. The computer program of claim 9 wherein the second protocol comprises HL7 V3.

32. The system of claim 13 wherein the first protocol is not HL7 V2.

33. The method of claim 13 wherein the second protocol is HL7 V3.

34. The method of claim 16, wherein the first and second filters are serial filters and an attribute in the configuration file specifies an order in which the first and second filters are invoked.

* * * * *

UNITED STATES PATENT AND TRADEMARK OFFICE
CERTIFICATE OF CORRECTION

Page 1 of 1

PATENT NO.           : 7,881,336 B2
APPLICATION NO.      : 11/092360
DATED                : February 1, 2011
INVENTOR(S)          : Majumdar It is certified that error appears in the above-identified patent and that said Letters Patent is hereby corrected as shown below:

In column 1, line 40, delete "heathcare" and insert -- healthcare --, therefor.

In column 6, line 31, delete "enqueing" and insert -- enqueuing --, therefor.

In column 6, line 54, delete "accoding" and insert -- according --, therefor.

In column 6, line 59, delete "wait_flag" and insert -- wait_ack_flag --, therefor.

In column 7, line 30, delete "conficturation" and insert -- configuration --, therefor.

In column 7, line 31, delete "xchema" and insert -- schema --, therefor.

In column 7, line 52, after "name" insert -- . --.

In column 13, line 28, in Claim 18, delete "HL7V2.4," and insert -- HL7 V2.4, --, therefor.

In column 14, line 50, in Claim 30, delete "HL7 ." and insert -- HL7. --, therefor.

In column 14, line 52, in Claim 31, delete "HL7 V3 ." and insert -- HL7 V3. --, therefor.

Signed and Sealed this
Twentieth Day of September, 2011

David J. Kappos
*Director of the United States Patent and Trademark Office*